United States Patent
Lindgren et al.

(10) Patent No.: US 6,221,237 B1
(45) Date of Patent: Apr. 24, 2001

(54) ELECTROKINETIC REMOVAL OF CHARGED CONTAMINANT SPECIES FROM SOIL AND OTHER MEDIA USING MODERATELY CONDUCTIVE ADSORPTIVE MATERIALS

(75) Inventors: Eric R. Lindgren, Albuquerque, NM (US); Earl D. Mattson, Idaho Falls, ID (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 09/339,788

(22) Filed: Jun. 24, 1999

(51) Int. Cl.[7] .................................................. B01D 59/40
(52) U.S. Cl. ........................................... 205/766; 204/516
(58) Field of Search .............................. 205/766; 204/516

(56) References Cited

U.S. PATENT DOCUMENTS

| | | | |
|---|---|---|---|
| 5,398,756 | 3/1995 | Brodsky et al. | 166/248 |
| 5,405,509 | 4/1995 | Lomasney et al. | 204/130 |
| 5,435,895 | 7/1995 | Lindgren et al. | 204/182.2 |
| 5,584,980 | * 12/1996 | Griffith et al. | 204/516 |
| 5,725,752 | * 3/1998 | Sunderland et al. | 205/687 |

OTHER PUBLICATIONS

C. F. Schrieber, Elgard Lida Products, Sugar Land, Texas; *Elgard Lida Deep Anode Groundbed Design and Installation guidelines*, Jan., 1994.

Manuel Perez–Candela, Jose M. Martin–Martinez, and Rosa Torregrosa–Macia, *Chromium(VI) Removal with Activated Carbons*, Wat. Res. vol. 29, No. 9, pp. 2174–2180, Jan., 1995.

* cited by examiner

Primary Examiner—Kathryn Gorgos
Assistant Examiner—Thomas H Parsons
(74) Attorney, Agent, or Firm—Russell D. Elliott

(57) ABSTRACT

Method for collecting and concentrating charged species, specifically, contaminant species in a medium, preferably soil. The method utilizes electrokinesis to drive contaminant species into and through a bed adjacent to a drive electrode. The bed comprises a moderately electrically conductive adsorbent material which is porous and is infused with water or other solvent capable of conducting electrical current. The bed material, preferably activated carbon, is easily removed and disposed of. Preferably, where activated carbon is used, after contaminant species are collected and concentrated, the mixture of activated carbon and contaminant species is removed and burned to form a stable and easily disposable waste product.

20 Claims, 2 Drawing Sheets

ELECTROKINETIC REMOVAL OF CHARGED CONTAMINANT SPECIES FROM SOIL AND OTHER MEDIA USING MODERATELY CONDUCTIVE ADSORPTIVE MATERIALS

STATEMENT REGARDING FEDERALLY SPONSORED RESEARCH OR DEVELOPMENT

This invention was made with Government support under Contract DE-AC04-94AL85000 awarded by the U.S. Department of Energy. The Government has certain rights in the invention.

BACKGROUND OF THE INVENTION

1. Field of the Invention

This invention relates to the field of decontaminating soils, groundwater and other compositions or substances that contain unwanted charged species. Specifically, the invention relates to options for remediation of soils contaminated with heavy metal ions, including soils wherein the contamination is located in the vadose (unsaturated) zone overlaying groundwater.

2. Description of the Related Art

According to the method of this invention, in situ electrokinesis is employed to drive contaminants toward an electrode positioned in the soil. This electrode (typically an anode, in the case in which contaminant plumes to be remediated include negatively charged contaminant ions and particles) is positioned in a hole in the soil with, in the preferred embodiment, activated carbon partially or completely filling the hole around the electrode.

Various methods of electrokinetic remediation of soil containing charged contaminant species have been described in patents and elsewhere in the scientific literature. Fundamentally, the concept relies on the principle that charged species exhibit mobility in soil, both as a result of diffusion and in response to electrical phenomena. This mobility is mediated, in part, by the presence of moisture in the soil. Charged contaminant particles may be either dissolved or partially soluble in soil moisture. For the most part, the contaminants of concern bear overall negative charges. This is because negatively charged species (for example, chromate ions and other anionic species) often are harmful to the physiology of humans and animals. In principle, though, electrokinetic methodologies would be effective in concentrating and removing positively charged species, as well. In at least one embodiment of the present invention, positively charge species may be removed from soil. Typically, however, negatively charged species are the target for removal. Several examples of existing methods, illustrating aspects of the current state of the art of electrokinetic remediation of soils, are summarized below.

In U.S. Pat. No. 5,405,509, "Remediation of a Bulk Source by Electropotential Ion Transport Using a Host Receptor Matrix", remediation of soil, concrete and groundwater is described according to a process using ion exchange. In that method, an electrode is placed in the ground surface generally near or at the center of contamination, and electrical currents are used to drive contaminants to it. A "host receptor matrix" or HRM comprising polymeric ion exchange resins is placed around an electrode and both captures the contaminant ions as they migrate toward the electrode and buffers hydrogen or hydroxyl ions generated at the electrode. The adsorption capacities of such resins, however, can be limited and further adversely affected by heating of soils occurring as a result of current flowing through the soils. Additionally, the presence of significant amounts of water enhances performance of the method in the '509 patent, and in fact, performance is optimized when this method is used in soils that are nearly saturated with water.

As will be described in detail below, in contrast to the method of the '509 patent, the method of the present invention takes advantage of a low pH environment in proximity to the electrode for instances wherein anionic species are to be collected and removed. Moreover, in the method of the present invention, there are no resins, such as are used in the '509 patent, that react adversely to heat (if heat is generated) and the method operates satisfactorily in soil well below the point of moisture saturation.

Another technique is described in Schrieber, C. F., "ELGARD LIDA Deep Anode Groundbed Design and Installation Guidelines", Specification number ELG-DG, rev. A, January 1994, ELGARD Corp., Sugar Land, Tex. This technique involves using petroleum coke as conductive fill in cathodic protection anode installations. Large-scale cathodic protection anodes may be constructed by hanging a string of iridium coated titanium anodes in an open borehole and filling the hole with petroleum coke. The purpose of the petroleum coke is fundamentally to provide even current distribution to the surrounding soil. It is not used in the Schrieber reference to distribute electrical potential within the bed, itself, and thereby enhance contaminant collection. While the resistivity of the petroleum coke when used in a particle bed is similar to that of a bed of moist activated carbon (in the range of approximately 2 to 50 ohm-cm), the Schrieber reference does not capitalize on this feature in the way it is exploited in the present invention, as will be described below. Moreover, petroleum coke, used by Schrieber, does not exhibit adsorbent characteristics comparable to activated carbon. The bed material in the present invention offers distinct advantages both in terms of its adsorptive and electrical characteristics.

In another patented methodology, described in U.S. Pat. No. 5,398,756, "In-Situ Remediation of Contaminated Soils", a treatment zone is defined within a region of contaminated soil. Electrodes are placed outside the region, and electrical currents are used to drive contaminants through the treatment zone where they are either destroyed or captured using, for example, biological or physicochemical contaminant treatment modalities. In the '756 patent, electroosmosis and/or electromigration cause the flow of contaminants into and through a treatment zone into which material for treating contaminants is introduced.

In contrast to the method of the '756 patent, the present invention does not use electrical potentials to drive contaminants through an in situ treatment zone, per se. Rather, electrokinetics is employed to move contaminant species toward and into a bed containing activated carbon or similar adsorptive material that exhibits favorable electrical characteristics that optimize movement of charged particles though the bed. The contaminants are captured in the bed where the resulting mixture of adsorptive material and contaminants is easily removed. The '756 patent does not concern concentrating contaminants in a bed containing material easily removed and disposed of, nor does it teach the advantageous electrical features associated with the materials used in the method of the present invention.

A previous patent by the inventors of the present invention described and claimed an electrokinetic electrode assembly for use in extraction of soil contaminants. U.S. Pat.

No. 5,435,895 "Electrokinetic Electrode System for Extraction of Soil Contaminants from Unsaturated Soils" described an assembly wherein a liquid comprising electrolyte solution, pure water, and soil water is retained within a housing to which an electrode is mounted. Engineered fluid flow takes place, subject to vacuum control, whereby contaminants are extracted by means of an electrode system while electrolyte and pure water are recycled.

The present invention offers a simplified method that does not require either engineered fluid flow or electrolytes. Instead, as will be described in detail below, the method of the present invention is largely passive, relying on the physics of electrokinesis and the favorable electrical and physical characteristics of the materials used.

Finally for purposes of this summary, there is mention in the literature of using activated carbon as an adsorbent for chromium (IV). An example is Perez-Candela, M., J. M. Martin-Martinez and R. Torregrosa-Macia, "Chromium (VI) Removal with Activated Carbons", Wat. Res., 29, 9, 2174–2180, 1995. Activated carbon has long been recognized as an adsorbent capable of removing organic compounds from water. During the past decade, studies have demonstrated that activated carbon is also capable of removing heavy metals from solution. The Perez-Candela, et al. reference mentioned here reports that chromate adsorption capacity of some activated carbons is as high as 3.5 g Cr/g carbon at a pH of 1. The present invention does not, however, rely exclusively on the adsorbent capacity described in the Perez-Candela, et al. report and others. Rather, as will be explained in detail below, the moderately conductive nature of carbon acts to enhance the efficacy of activated carbon for contaminant removal in the context of the method of the present invention. This is over and above the effects that may be attributed to the adsorbent capabilities of the activated carbon.

Each of the treatment approaches described exhibit certain benefits in treatment of contaminated soils and water. There remains, however, a need for an improved electrokinetic soil remediation method that takes advantage of naturally occurring low pH conditions near the anode functioning in an environment where water is present, and that exploits the electrical characteristics of moderately conductive materials to improve capture of charged contaminant species. Additionally, there remains a need for such a remediation method that yields a stable and easily disposable final waste form.

SUMMARY OF THE INVENTION

Accordingly, an object of the invention is to provide a method of contaminant removal that includes capturing contaminants within a bed of material that is easily removed and disposed of after contaminants are captured therein.

Another object of the invention is to provide such a method wherein the bed is porous and includes moderately electrically conductive material.

Another object of the invention is to provide a porous bed wherein the moderately electrically conductive material is in physical contact with water or other similar solvent through which charged particles can pass.

An advantage of the present invention is that it provides a method for contaminant removal for soils wherein the method takes advantage of the moderately electrically conductive nature of activated carbon.

Another advantage of the invention is that it also takes advantage of the adsorbent characteristics of activated carbon.

Yet another advantage of the invention is that it provides for convenient collection and removal of the waste material into which contaminants are concentrated as a consequence of electrokinetic activity.

Yet another advantage of the invention is that the method results in an extremely stable waste product that is conveniently disposed.

Yet another advantage of the present invention is that the method of the invention conveniently operates effectively over either a short period of time or a longer period of time up to months or even years, depending on the requirements of a particular application.

These and other objects and advantages are fulfilled by the method of the claimed invention wherein charged species in a medium are collected and concentrated by placing at least a first electrode and a second electrode in the medium; positioning, in proximity to the first electrode, adsorptive moderately conductive material; and applying an electrical potential to the electrodes so that the first electrode and the second electrode exhibit opposite charges. The objects and advantages of the invention are further fulfilled by the claimed method for remediating soil containing electrically charged contaminants, including forming a recess including a boundary in the soil containing the electrically-charged contaminants; positioning, in the recess, a first electrode whereby a space remains between the electrode and the boundary of the recess; placing moderately conductive adsorbent material in the space; inserting at least one electrode other than the first electrode into the soil at a location different from where the recess was formed; and applying potentials to the electrodes so that the first electrode exhibits a first charge and the at least one electrode other than the first electrode exhibits a second charge that is the opposite of the first charge.

Additional advantages and novel features will become apparent to those skilled in the art upon examination of the following description or may be learned by practice of the invention. The objects and advantages of the invention may be realized and attained by means of the instrumentalities and combinations particularly pointed out in the appended claims.

DESCRIPTION OF THE FIGURES

The accompanying drawings, which are incorporated into and form part of the specification, illustrate embodiments of the invention and, together with the description, serve to explain the principles of the invention.

FIG. 1 also shows generally the direction of flow of negatively charged contaminants when the method is in operation.

DETAILED DESCRIPTION OF THE INVENTION

Figure 1:
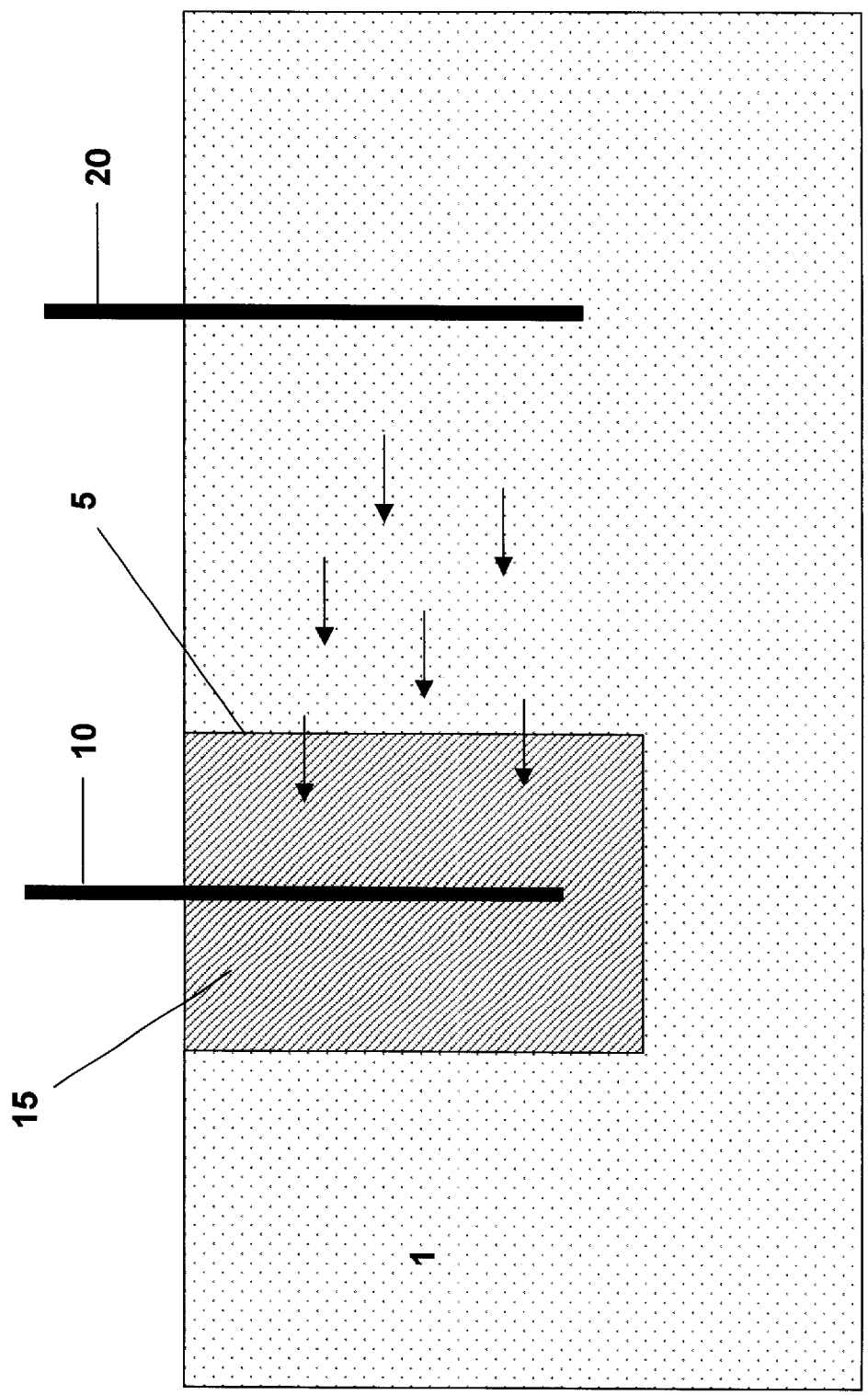
FIG. 1 is a drawing that shows schematically the various elements associated with one embodiment of method of the invention including an anode and a cathode positioned in soil, and a region containing activated carbon in proximity to the anode.

The present invention provides a method for effectively collecting and concentrating charged contaminant species in soil. A key component of the present invention is its use of what is referred to herein as "moderately conductive material" (or "MCM"). For purposes of this disclosure, MCM means a material that is neither a good conductor nor a good insulator, but which instead exhibits moderate electrical conductivity.

In the context of the present invention, MCM is used as a component of a porous bed of material positioned adjacent to a drive electrode in the electrokinetic remediation method described in this disclosure. Also in the bed is a solvent, such as moisture present within the pores of the porous bed, through which charged particles can move in response to electrical influence. Preferably, for purposes of the present invention, the resistivity of a bed containing MCM and solvent falls in the range of about 1–100 ohm-cm. Indeed, the "dry" component (bed material absent solvent) can be comprised solely of MCM, but it need not be if convenience dictates that the MCM be mixed with another material. Therefore, for purposes of this disclosure, where MCM is mentioned in connection with a bed containing MCM, such mention is generally intended to include both MCM alone and MCM in combination with other material, so long as the resulting bed, which includes the MCM and solvent exhibits resistivity in the range noted above.

The significance of using MCM in the bed generally concerns the fact that electrical resistance associated with the bed is divided between both the "dry" component of the bed and the solvent component. As will be described in more detail below, movement of charged species through the porous bed is optimized as a result of current passing, subject to resistance, through both the "dry" bed component and the moisture or other solvent within the bed.

As mentioned above, the soil contamination problems primarily of concern involve anionic species such as water-soluble heavy metal oxyanions. Examples of these include $CrO_4^{2-}$, $HAsO_4^{2-}$, $MoO_4^{2-}$, $SeO_4^{2-}$, $TcO_4^-$, and $ClO_4^-$. It is noted, however, that by simply reversing polarity of the electrodes, cationic species may be collected and concentrated according to the method of the invention.

Fundamentally, in the preferred embodiment, the invention involves placement of electrodes in soil at or near an area of contaminated soil. In the case where the soil to be remediated contains negatively charged contaminant ions or particles, when an electrical potential is exerted using an anode and a cathode, the negatively charged contaminant species tend to migrate toward the anode while positively-charged species tend to migrate toward the cathode.

The present invention enhances the benefit associated with this phenomenon in three ways: First, since the objective is to drive contaminants to a location where they become concentrated and then conveniently removed, preferably, multiple cathodes per anode are used. The cathodes are spaced at intervals around the contamination plume (or, as necessary, outside of the contamination plume). In this way, larger volumes of soil can be effectively remediated as compared with using only one anode and one cathode, thus taking fuller advantage of three-dimensional movement of charged species. Second, the invention method utilizes an adsorbent MCM placed in proximity to the anode to collect the contaminant species. In the preferred embodiment, this material comprises activated carbon which allows efficient transition between electron conduction at the drive electrode surface (the drive electrode being the anode in the instance in which negatively charged species are removed from soil) and ionic conduction in the soil pore water. (It is important to note that in this transition zone, both electron conduction and ionic conduction occur simultaneously when the method of the invention is in operation.)

Additionally, activated carbon exhibits adsorbent behavior over a large surface area thereby enabling large amounts of contaminants to be adsorbed per unit volume of concentration material Third, as water is hydrolyzed throughout the MCM bed (due to the electron-conduction component of current carried in the bed), the concentration of hydrogen ions in the region in proximity to the electrode increases, causing acidic conditions there. The invention capitalizes on this phenomenon in the preferred embodiment in several ways. The acidic conditions serve to protonate the surface of the activated carbon, thus enhancing adsorption of anionic contaminant species. Additionally, the acid enhances reduction of the anionic species being collected. This can have the effect of lessening both the mobility of contaminants in the environment and the toxicity of the contaminant material. For example, in the case of chromate, Cr (III), a reduced form of chromium, is considered by many to be less carcinogenic than Cr (IV). For purposes of this disclosure including the appended claims, when referring to the location of the adsorbent moderately conductive material in relation to an electrode, "in proximity to" means within the electrical influence of the electrode. As such, in order for the MCM to perform its desired function in the context of the invention, that material can surround or partially surround the electrode. Or, alternatively, the material can be positioned above, below or to the side of the electrode. It is necessary, though, that a portion of the MCM bed is in electrical contact with the electrode (meaning, at least some electrons from the drive electrode are conducted into, and are distributed in, the MCM). Also, the MCM needs to be positioned so that when a potential is applied to the electrode causing migration of charged species, at least some of the migrating charged species impact and/or pass into or through the material. Generally in this disclosure, unless otherwise noted, where reference is made to activated carbon, the invention contemplates use of any other adsorbent moderately conductive materials exhibiting characteristics similar to those of activated carbon, to the extent those characteristics are relevant to the processes or mechanisms being described.

The principles of the invention are pertinent to any applications requiring collection and concentration of charged species present in any medium comprising a solvent capable of dissolving or partially dissolving the charged species. The invention was developed in the context of remediation of soil (a porous matrix comprising solid matter and moisture), and in the preferred embodiment, activated carbon serves as the MCM. However, the suitability of the claimed invention in other applications is recognized, including contaminant removal from porous matrices other than soil, and even from liquids such as water (if a means for containing the MCM in proximity to the drive electrode is provided). Such other applications, likewise, are intended to fall within the claimed scope of the invention.

FIG. 1 illustrates a preferred embodiment of the invention. Referring to the Figure, a holes is dug in soil 1 containing contaminants. For purposes of this example, assume that the contaminants to be collected, concentrated and removed as part of a remediation effort comprise negatively charged species. Also assume that the soil is not entirely dry. (It need not be saturated or nearly saturated for the method to be effective, however.) Into the hole 5 is placed an electrode (sometimes referred to herein as the drive electrode) that will function in this embodiment as the anode 10 according to the method of the invention. Activated carbon moistened with a solvent is poured in the hole 5 around the anode 10 forming an activated carbon bed 15, and at least one (and preferably more than one) cathode 20 is placed in the ground at distance from the anode 10. The precise location of the electrodes with respect to the contaminants is not a critical consideration so long as negatively charged contaminants are located somewhere within the electrical influence of the both the anode and at least one cathode. For convenience, the Figure illustrates only a single cathode 20, however, it is contemplated that more cathodes (not shown) would be used, as well. An electrical potential is placed across the anode 10 and the cathode 20 causing them to attain relative positive and negative charges, respectively. Techniques for applying the electrical potential, for all embodiments of the invention contemplated by this disclosure, are simple and well known to practitioners skilled in the art of electrical phenomena. Typically, such techniques will involve use of a power supply and conductive wires (not shown in the Figure) to apply charges to the electrodes, however, other methods for accomplishing this end (including, for example, using induction or other phenomena to charge the electrodes) are likewise suitable and fall within the scope of the invention.

As a consequence of the opposite polarities of the two electrodes shown, negatively-charged ions and particles are repelled by the cathode 20 and attracted by the anode 10 causing a general movement of those negatively charged ions and particles in the direction shown by the arrows in the Figure. (Although it is not specifically shown in the Figure, in this embodiment, positively charged species migrate toward the cathode at the same time negatively charged species migrate toward the anode.) The optimal amount of voltage necessary to accomplish the desired migration will depend on various factors including the distance between the electrodes, electrical conductivity of the soil between the electrodes, the species to be collected and concentrated, and the characteristics of the electrodes themselves. Also, since application of a voltage potential has the capacity to cause the soil to heat, if this is considered detrimental in a given application, the voltage applied may be reduced accordingly (with a consequent reduced rate of migration of charged contaminant species). The voltage, though, must at least be sufficient to overcome both the natural diffusion of contaminant species through the soil and any other phenomena, including physical and electrical phenomena, that may be present and driving contaminant species in directions other than toward the drive electrode. In practice, determining the optimal voltage potential to be applied for any given situation will depend on a variety of variables known and understood to those skilled in the art. As an example, a suitable power density (current density×voltage gradient) can fall in the range of about 1–10 $W/m^3$ (e.g. about 10 V/m and 1 $A/m^2$, for 10 ohm-m soil).

Fundamentally, the advantageous electrical characteristics associated with activated carbon (or other MCMs) are largely responsible for the optimized behavior of the bed in the present invention. As mentioned earlier in this disclosure, the bed adjacent to the drive electrode comprises two main parts: the MCM and the solvent. In the preferred embodiment, these are activated carbon and moisture (water). As current passes through the bed, resistance is encountered both in the MCM and in the solvent. (Conversely, current is able to travel, subject to resistance, through both the MCM and the solvent.) This has the beneficial consequence that the electrical potential is distributed relatively evenly throughout the bed, thus permitting electron transfer reactions, responsible for movement of ions, to be distributed throughout the porous bed as well.

If the bed comprised metal or some other good conductor, current flow by electron conductior though the metal would be strongly favored over current flow though the solvent. As a result, substantially all of the electron transfer reactions would take place on the outside periphery of the metal-containing bed. Accordingly, absent a potential gradient within the bed, charged contaminant species would build up on the outside of the bed, but would tend not to penetrate the bed in response to electrical forces. Ionic movement within the porous media would not take place to any appreciable extent.

Alternatively, if the bed were made of a non-conductive insulating material, current flow by ionic conduction in the solvent would be heavily favored. Electron transfer reactions, in this instance, would not likely occur except at the surface of the drive electrode. This would cause heating of the drive electrode as well as corrosion and deactivation of the drive electrode (due to hydrolysis and formation of oxygen gas on the electrode surface). Under these conditions, the result would be substantially the same as if the drive electrode were simply placed in the soil absent the bed.

The present invention, however, allows for distribution of electron transfer reactions throughout the bed. Because current passes through both the MCM matrix and the solvent, an electrical potential gradient is distributed in the bed. As a result, ionic conduction in the bed drives ions through the bed, faster than diffusion, but slowly enough that they can be concentrated effectively in the bed matrix until such time as the bed material is removed and replaced with clean (or reconstituted) material. Rapid corrosion and deactivation of the drive electrode is likewise avoided.

It is anticipated that installations using the method of the present invention may operate for up to twenty years (or perhaps longer) using electrode current densities and voltages similar to those employed with cathodic protection electrodes that have been shown to last for twenty years. Additionally, as noted above, the acidic conditions at or near the anode serve to enhance the mechanisms of the present invention method, despite the fact that some earlier technical approaches taught that acid at the anode could be a hindrance. There does appear to be some variability based on the species to be collected and concentrated using the invention method. It is noted that for some contaminants, such as arsenate, maximum adsorption occurs at neutral pH. In such cases, the acid generated in the region adjacent to the electrode can be neutralized. As an example, the activated carbon can be moistened with a basic solution, and a slowly dissolving solid base such as magnesium hydroxide can be mixed with the activated carbon to neutralize the acid formed.

It is appropriate how to mention that although the preferred embodiments thus far described have focused collection and concentration of negatively charged species in soil, the principles of the invention apply equally well to removing positively charged species from soil. Specifically, this can be accomplished by reversing polarity of the electrodes and using a cathode as the drive electrode in the bed of adsorptive semiconductor material, with at least one anode (preferably multiple anodes) positioned at a distance from the cathode. In this way, positive species such as $K^+$, $Mg^{2+}$ and $Sr^{2+}$ (in principle, any species, dissolved or partially soluble in the soil moisture and exhibiting an overall positive charge) can be collected, concentrated and removed. As pointed out above, however, such positively charged species frequently are not considered to be as much of a concern, from the standpoint of environmental remediation, as negatively charged contaminants. In those cases in which this method is applied using the electrode polarities described in this paragraph (wherein a cathode, rather than an anode, is the drive electrode), it is likely that pH will rise in proximity to the drive electrode, again due to hydrolysis of water. It is acknowledged that this effect may cause precipitation reactions, which if not avoided though chemical or other means can present a major complication. Additionally, in order to attract positively charged species, it may be desirable to neutralize the environment surrounding the cathode. The neutralization can be accomplished by moistening the activated carbon (or other adsorptive MCM) with an acidic solution.

The field implementation of the method of the invention is simple and straightforward. (This implementation example will assume that negatively charged species are the target contaminants.) The drive anode is installed by simply drilling a hole or a series of holes somewhere in the middle of a contaminated region. An anode is hung in each open hole, and then each hole is filled with moistened activated carbon. In the preferred embodiment, the anode comprises Ti coated with Ir. (Other cathode protection means are also suited to the invention, however, Ti coated with Ir, in general, is presently considered to be the best approach for creating a long-lived electrode.) The cathodes may be bare metallic rods (like iron rebar or pipe) driven into the ground. This may be accomplished by any means suited to this purpose, but an effective approach is to pneumatically drive the cathodes into the ground. The cost for installing these simple cathodes is very low, allowing for a large number of them to be used. By using numerous cathodes per anode, more even current distribution can be achieved than where fewer cathodes are used, thus allowing soil heating to be minimized. The low cost of placing cathodes will also allow the possibility of installing additional cathodes closer to the anodes as the remediation proceeds. Doing so will have the effect of "herding" the contaminants to the collection anodes, as described more in detail below.

In the preferred embodiment, a small electrical potential is applied between the positively and negatively charged electrodes such that the power input to the soil is low (for example, less than $10W/m^3$). The low power input will increase the time required for the remediation, but it will also minimize soil heating and allow the use of low cost power supplies. The process can operate for long periods of time with little operator attention. It may be necessary to periodically add small amounts of moisture to the activated carbon to maintain optimal conditions. On a monthly to bi-monthly basis, the exhausted activated carbon will need to be replaced. The moist activated carbon, even with a moisture content as much as 64.14 wt % (37.37 g dry activated carbon and 176.55 g water) or more, appears and handles as if it were dry, and can easily be removed from the hole with a vacuum system.

Alternatively, if it is necessary or desirable to cause charged contaminant species to migrate faster, higher potentials may be applied without undermining the physical and electrical mechanisms underlying the invention, provided that the potentials are not high enough to degrade the activated carbon or the electrodes. This is mentioned in recognition of the fact that there may be situations wherein remediation objectives require the process to occur faster than over a period of months or years. It is noted, however, that by driving the process faster, soil heating may become an issue.

Figure 2B:
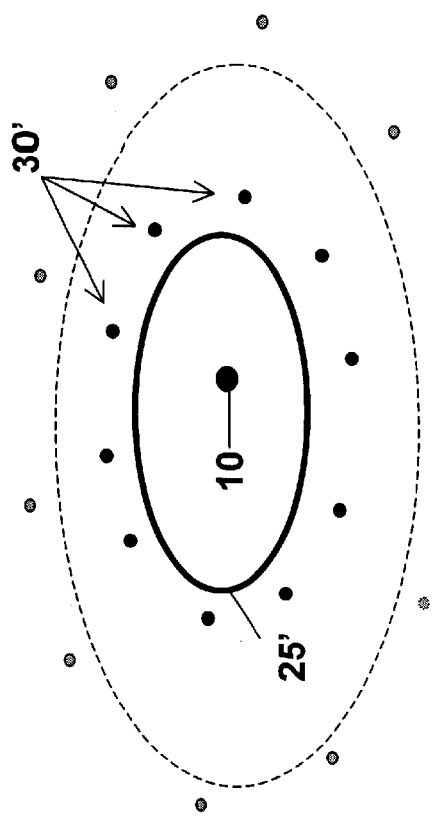
FIGS. 2a and 2b illustrate the positioning of electrodes according to the preferred embodiment of the invention, as well as the principle of "herding" contaminants as described in the specification.
Figure 2A:
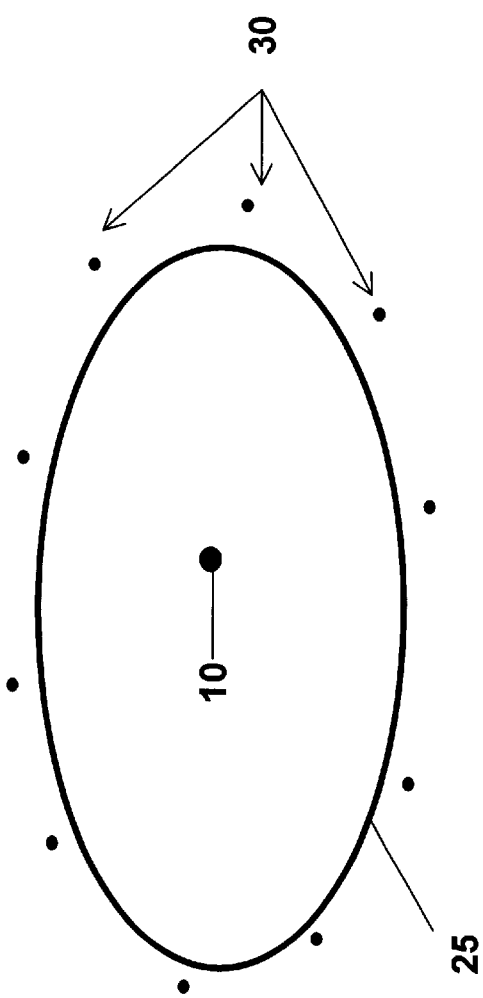

As suggested above, a "herding" effect can be achieved by moving cathodes as the contaminant migration proceeds. By moving cathodes closer to the anodes, the power efficiency of the process increases and soil heating can be more easily controlled. FIGS. 2a and 2b illustrate how this "herding" of contaminants could take place. FIG. 2a shows schematically a contaminant plume having an outer perimeter 25. The drive electrode (in this case, an anode 10) is positioned in the ground generally near the middle of the plume. Multiple cathodes 30 are placed at various locations outside of the outer perimeter 25 of the plume. Electrical potential is then applied to the anode 10 and the cathodes 30 causing negatively charged species within the plume to begin to migrate toward the anode 10. FIG. 2b illustrates the same plume after time has passed and the size of the plume has decreased due to migration of contaminants inward toward the anode 10. The Figure also illustrates that outer perimeter 25' or the plume has likewise decreased in size. The power efficiency benefits of "herding" are accomplished when the cathodes are moved inward, closer to the anode 10. (In FIG. 2b the cathodes are designated 30' to account for the fact that, although their function is the same as in FIG. 2a, their position is altered. The original positioning of the cathodes and the original location of the outer perimeter of the plume from FIG. 2a are shown in FIG. 2b, in phantom, to illustrate the reducing size of the plume.) A slightly different embodiment that will accomplish the same "herding" result is to use a tiered approach in placing the cathodes. In this case, a first set of cathodes could be placed near or outside the original plume perimeter, and then additional sets of cathodes could be placed at various radial distances from the cathode, inside the plume. As contaminants then migrate inward toward the anode, the various sets of cathodes could be successively activated (and deactivated) according to the progress of the migration of contaminants toward the anode.

One of the advantages of the present invention is that, when activated carbon is used as the adsorptive semi-conductive bed material, an extremely stable waste form is generated. Activated carbon commonly contains a small amount of iron. When chromium, for example, is adsorbed by the activated carbon, the chromium combines with the iron in the activated carbon. If this product is then burned a highly insoluble crystalline material is formed that is present in the residual ash. We have observed that this material will not dissolve in concentrated hydrofluoric acid. Although this precludes convenient quantitation of the chromium content in the activated carbon using extraction or total digestion methods, it is apparent that combustion results in a tremendous volume reduction in waste and an extremely stable final waste form.

EXAMPLE

The following experiment demonstrates the feasibility of removing chromate from unsaturated soil using an activated carbon bed around an anode. This experiment used a bare stainless steel wire mesh cathode (analogous to multiple steel or iron cathodes positioned near the outside perimeter of a contaminant plume). Clean dry soil (1455 g) was mixed with 145.5 g of water containing 0.291 g of Cr(VI) resulting in soil with 200 ppmw Cr(VI) and 10 wt % moisture. This soil was packed in a 4.5 inch I.D. cylindrical cell with a 1-inch diameter spacer in the center. The spacer was removed, a 0.25-inch diameter iridium coated titanium electrode was held in the center and the void between the electrode and the soil was filled with 44.92 g of activated carbon moistened to 64.14 wt % (27.37 g dry activated carbon and 17.55 g water). Even at this moisture content, the activated carbon still appears and handles as if it were dry.

The experiment was operated at 100 mA for the first 17.5 hours and at 50 mA for an additional 27 hours. Ion chromatography analysis of deionized water extracts of nine soil samples taken at three depths and three radial locations showed the water soluble chromate concentration was reduced from 200 ppmw to an average of 0.3 ppmw Cr(VI). XRF analysis of the activated carbon revealed significant amounts of chromium (~6,000 ppmw Cr on average). This experiment demonstrates that electrokinetics can be used to remove chromate from unsaturated soul and concentrated in the activated carbon by a factor of at least 30.

The invention being thus described, it will be obvious that the same may be varied in many ways. Such variations are not to be regarded as a departure from the spirit and scope of the invention, and all such modifications as would be obvious to one skilled in the art are intended to be included within the scope of the appended claims. The particular equipment discussed above are cited merely to illustrate particular embodiments of the invention. It is contemplated that the use of the invention may involve components having different characteristics. It is intended that the scope of the invention be defined by the claims appended hereto. The entire disclosures of all references, applications, patents and publications cited above are hereby incorporated by reference.

We claim:

1. A method for collecting and concentrating charged species in a medium, the method comprising the steps of:
   a) placing at least a first drive electrode and a second drive electrode in the medium;
   b) positioning, in proximity to the first drive electrode, adsorptive moderately electrically conductive material; and
   c) distributing electrical potential through the adsorptive moderately electrically conductive material by energizing the drive electrodes so that the first drive electrode and the second drive electrode exhibit opposite charges.

2. The method of claim 1 wherein the medium comprises a solvent in which the charged species is at least partially dissolved.

3. The method of claim 2 wherein the medium further comprises a porous matrix.

4. The method of claims 3 wherein the porous matrix comprises soil and the solvent comprises moisture.

5. The method of claim 4 wherein the adsorptive moderately electrically conductive material comprises activated carbon.

6. The method of claim 1 wherein the adsorptive moderately electrically conductive material comprises activated carbon.

7. The method of claim 2 wherein the adsorptive moderately electrically conductive material comprises activated carbon.

8. The method of claim 3 wherein the adsorptive moderately electrically conductive material comprises activated carbon.

9. A method for remediating soil containing electrically charged contaminants, the method comprising the steps of:
   a) forming a recess including a boundary in the soil containing the electrically-charged contaminants;
   b) positioning, in the recess, a first drive electrode whereby a space remains between the first drive electrode and the boundary of the recess;
   c) placing moderately electrically conductive adsorbent material in proximity to the first drive electrode in the space;
   d) inserting at least one drive electrode other than the first drive electrode into the soil at a location different from where the recess was formed; and
   e) applying potentials to the drive electrodes so that the first drive electrode exhibits a first charge and at least one drive electrode other than the first drive electrode exhibits a second charge that is opposite of the first charge and electrical potential is distributed through the moderately electrically conductive adsorbent material.

10. The method of claim 9 wherein the moderately electrically conductive adsorbent material comprises activated carbon.

11. The method of claim 10 wherein the at least one drive electrode other than the first drive electrode is a plurality of drive electrodes other than the first drive electrode.

12. The method of claim 11 wherein the electrically charged contaminants are contained within a plume in the soil, the plume including a perimeter, and wherein the positioning of the plurality of drive electrodes other than the first electrode is selected from the group consisting of: all such drive electrodes outside the perimeter, all such drive electrodes inside the perimeter, and fewer than all such drive electrodes inside the perimeter with the remainder of such drive electrodes outside the perimeter.

13. The method of claim 12 wherein the first drive electrode functions as an anode and the drive electrodes other than the first drive electrode function as cathodes.

14. The method of claim 13 wherein the electrically charged contaminants comprise oxyanions.

15. The method of claim 14 wherein the oxyanions include compounds comprising chromium.

16. The method of claim 15 further comprising the steps of:
   removing the activated carbon after the potential has been applied and oxyanions include compounds comprising chromium enter the activated carbon; and
   burning the activated carbon.

17. The method of claim 14 wherein the oxyanions include compounds comprising arsenic.

18. The method of claim 17 further comprising the step of adding base to the activated carbon.

19. The method of claim 17 wherein power output associated with the potential applied to the electrodes is less than 10 W/m$^3$.

20. The method of claim 12 wherein the first drive electrode functions as a cathode and the drive electrodes other than the first drive electrode function as anodes.

* * * * *